(12) United States Patent
Dobbs et al.

(10) Patent No.: US 7,399,331 B2
(45) Date of Patent: Jul. 15, 2008

(54) GAS PHASE CONTAMINANT REMOVAL WITH LOW PRESSURE DROP

(75) Inventors: Gregory M. Dobbs, South Glastonbury, CT (US); Timothy Obee, South Windsor, CT (US); Darren S. Sheehan, West Hartford, CT (US); James D. Freihaut, South Windsor, CT (US); Stephen O. Hay, South Windsor, CT (US); Norberto O. Lemcoff, Simsbury, CT (US); Joseph J. Sangiovanni, West Suffield, CT (US); Mary Saroka, Syracuse, NY (US); Robert C. Hall, Nutley, NJ (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/857,301

(22) Filed: May 28, 2004

(65) Prior Publication Data

US 2005/0118078 A1    Jun. 2, 2005

Related U.S. Application Data

(60) Provisional application No. 60/474,638, filed on May 29, 2003.

(51) Int. Cl.
*B01D 50/00* (2006.01)
(52) U.S. Cl. .................. 55/315; 55/315.1; 422/169; 422/186.3
(58) Field of Classification Search .................. 55/315, 55/315.1, 318; 422/169, 186.3; 96/223, 96/224, 225
See application file for complete search history.

(56) References Cited

U.S. PATENT DOCUMENTS

| 3,967,927 | A | * | 7/1976 | Patterson ................ 422/121 |
| 5,835,840 | A | * | 11/1998 | Goswami ............... 422/186.3 |
| 5,993,738 | A | | 11/1999 | Goswani |
| 6,072,273 | A | | 6/2000 | Schoenbach et al. |
| 6,358,374 | B1 | | 3/2002 | Obee et al. |
| 6,398,970 | B1 | | 6/2002 | Justel et al. |
| 6,503,464 | B1 | | 1/2003 | Miki et al. |
| 6,569,386 | B1 | | 5/2003 | Ko et al. |
| 6,887,816 | B2 | | 5/2005 | Tanaka et al. |
| 2003/0019738 | A1 | | 1/2003 | Reisfeld et al. |

(Continued)

FOREIGN PATENT DOCUMENTS

EP          0325133 A1       9/1989

(Continued)

OTHER PUBLICATIONS

Muller, Chris, Improving Building IAQ Reduces HVAC Energy Cost, article, 21 pages, Purafil, Inc., Doraville, Georgia, USA.

(Continued)

*Primary Examiner*—Robert A Hopkins
(74) *Attorney, Agent, or Firm*—Bachman & LaPointe, P.C.

(57) ABSTRACT

A system is disclosed which incorporates low pressure drop contaminant removal from gas phases or streams, which advantageously can be used to enhance efficiency, improve humidity characteristics, and reduce capital cost of air handling systems such as HVAC systems and the like. Placement of the low pressure drop contaminant removal mechanism for enhancing effectiveness of same is also disclosed.

25 Claims, 5 Drawing Sheets

U.S. PATENT DOCUMENTS

2003/0021720 A1 1/2003 Reisfeld et al.
2004/0041564 A1* 3/2004 Brown ..................... 324/318

FOREIGN PATENT DOCUMENTS

EP 1112752 A2 4/2001
EP 1281431 A1 7/2002

OTHER PUBLICATIONS

Introducing the Dave Lennox Signature TM Collection Pureair TM Air Purification Systems, pamphlet, 2002, 6 pages, Lennox Industries Inc.

Technology Focus: Air Filters, IAQ and Energy Efficiency: Mutually Exclusive Goals? journal, Sep. 1997, 4 pages, vol. 7, No. 7, Indoor Environment Review.

Hall, Robert J., et al., Design of Air Purifiers for Aircraft Passenger Cabins Based on Photocatalytic Oxidation Technology, Air Quality and Comfort in Airliner Cabins, article, 2000, ASTM STP 1393, N.L. Nagda, Ed., American Sociaty for Testing and Materals, West Conshohocken, PA, USA.

Vuurman, Michael A., et al., In Situ Raman Spectroscopy of Alumina-Supported Metal Oxide Catalysts, , The Journal of Physical Chemistry, article, 1992, 9 pages, vol. 96, No. 12.

Hall, Robert J., Photocatalytic Oxidation Technology for Trace Contaminant Control in Aircraft and Spacecraft, Paper Series, article for conference, Jul. 8-11, 1996, 14 pages, SAE International, Warrendale, PA, USA.

* cited by examiner

GAS PHASE CONTAMINANT REMOVAL WITH LOW PRESSURE DROP

CROSS REFERENCE TO RELATED APPLICATION

This application claims the filing date of provisional application Ser. No. 60/474,638, filed May 29, 2003.

BACKGROUND OF THE INVENTION

The invention relates to air or other gas phase handling systems and, more particularly, to removal of contaminants from gas phases.

One type of air handling system to which the present invention applies is heating, ventilation and air conditioning (HVAC) systems, which are typically used to supply the heating, ventilation and cooling needs of buildings. Typically, HVAC systems are designed for four primary functions which are (1) exhaust and/or introduce outside air into the building and distribute separately or mix with recirculated air from the building, (2) cool and/or dehumidify the mixed outdoor and/or recirculated air for distribution throughout the building, (3) heat the mixed outdoor and/or recirculated air for distribution throughout the building and (4) distribute air throughout the building.

Typical HVAC systems contain various pieces of equipment and components including heating and cooling coils, air moving devices, air-controlled dampers and particle filters, for example. The size of an HVAC system depends upon several factors including the amount of air to be distributed and conditioned as well as the region and climate in which the building is located.

In order to satisfy building ventilation requirements as set by Code and ASHRAE Standard 62-2001: VENTILATION FOR ACCEPTABLE INDOOR AIR QUALITY, HVAC systems may either supply a prescribed amount of outside air to the building or an alternate amount of outside air can be used if an air purifier is used in the system and an equivalent air quality is provided.

Purifying and recirculating air is desirable as air handled in this manner can be substituted for an equivalent amount of outside ventilation air, which in turn provides reduced capacity, capital cost and energy savings. In addition, humidity is reduced by reducing the source of humidity from the outside air stream during certain times of year, particularly when the outside air is a substantial source of humidity.

However, purification is typically accomplished using gas phase filtration methods including adsorption, in which certain chemicals adhere to the surface, and chemisorption, where chemical reactions occur on the surface of an adsorptive filtration media. Unfortunately, increased energy cost results due to the need to overcome the pressure drop caused by the media, and the media must also be replaced, regenerated and/or disposed of, leading to additional cost as well.

It is clear that the need remains for improved air purification as well as capacity reduction, capital cost and energy savings due to use of such improved air purification capability in HVAC systems and the like.

SUMMARY OF THE INVENTION

In accordance with the present invention, it has been found that several methods for contaminant removal from a gas phase, with low pressure drop, can advantageously be incorporated into HVAC and like systems for the purpose of purifying a gas such as an air stream passed therethrough without substantially increasing the work which must be performed by the system to overcome various pressure drops and the like which are typically encountered utilizing filtration media.

The air purifying mechanism in accordance with the present invention is advantageously a mechanism whereby contaminants can be removed with minimal pressure drop.

Specific examples of such mechanisms include oxidative destruction of contaminants through photocatalytic oxidation (PCO), which can advantageously be accomplished utilizing ultraviolet wavelength light, for example, and in other manners as well.

The air purification mechanism in accordance with the present invention can advantageously be incorporated into a wide variety of air handling systems, such as HVAC and like systems, and is preferably positioned in such systems at a point where humidity is less than a prescribed level, whereby the oxidation reaction which is desired proceeds at excellent rates.

Combination of the air purification mechanism in accordance with the present invention with other air handling devices can advantageously allow for removal of diverse contaminants, including viruses and biocontaminants, the removal of which would otherwise require large pressure drop filters.

Furthermore, in accordance with a preferred embodiment of the present invention, ultraviolet photocatalytic oxidation is utilized which results in a system which is substantially self-cleaning in that the ultraviolet light serves to remove any contaminants deposited on the mechanism.

In further accordance with the invention, in the embodiment wherein ultraviolet photocatalytic oxidation is utilized, the ultraviolet light can be generated from a variety of sources, including conventional ultra-violet (UV) lamps (mercury based), as well as light-emitting diode (LED), light-emitting electromechanical cells (LEC), excimer, sono-luminescence, dielectric barrier discharge lamps, direct sunlight, and combinations thereof.

The system and method of the present invention are useful in a wide range of applications including residential, commercial and other structures. Further, the system and method are useful in satisfying any codes, requirements or other goods for provision of outside or purified air in various structures.

BRIEF DESCRIPTION OF THE DRAWINGS

A detailed description of preferred embodiments of the present invention follows, with reference to the attached drawings, wherein.

DETAILED DESCRIPTION

The invention relates to a system and method for air purification, and for incorporation of an air purification mechanism into air handling systems, whereby air streams are purified with a low pressure drop, advantageously providing for improved system efficiency, reduction in required system capacity, removal of potentially harmful contaminants from the air stream improved humidity control characteristics and other benefits.

U.S. patent application Ser. Nos. 09/916,875, published Jan. 30, 2003 as Pub. No. U.S. 2003/0021720 and Ser. No. 09/916,876, published Jan. 30, 2003 as Pub. No. U.S. 2003/0019738, and both filed Jul. 30, 2001, disclose related systems, and are co-pending and commonly owned. These applications are specifically incorporated herein by reference.

Figure 1:
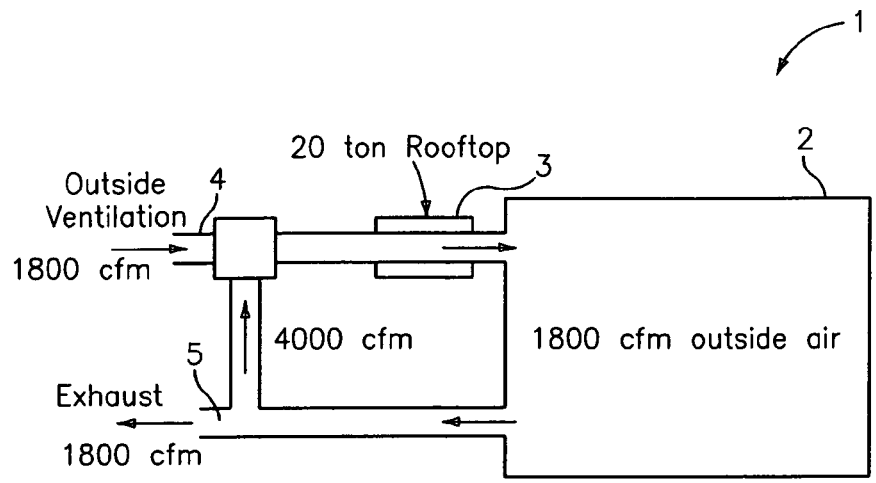
FIG. 1 schematically illustrates a typical air handling system in accordance with the prior art.

One type of air handling system to which the present application has specific application is in connection with heating, ventilation and air conditioning (HVAC) systems, one typical example of which is schematically illustrated in FIG. 1. FIG. 1 shows a system 1 for conditioning air to a space 2 using a rooftop cooling unit 3. Assuming desired and/or required feed of clean air to space 2 in an amount of 1,800 cfm, this amount is obtained from an outside source such as outside ventilation 4, and a like amount is exhausted through exhaust 5. While this provides for the desired amount of outside air, it should readily be appreciated that system capacity and efficiency are adversely impacted by the need for thermally conditioning and dehumidifying the full 1,800 cfm from outside conditions to those desired in space 2.

Figure 2:
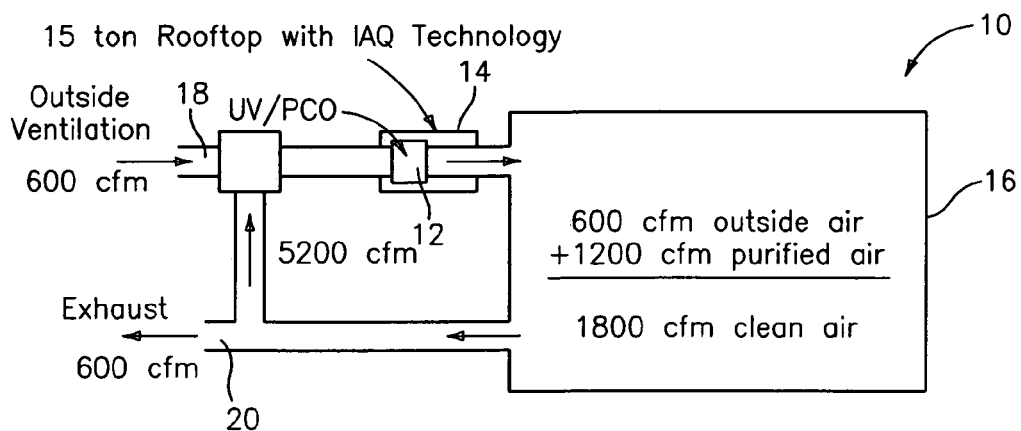
FIG. 2 illustrates an improved system including air purification in accordance with the present invention.

Turning to FIG. 2, a system 10 is illustrated in accordance with the present invention which advantageously incorporates a mechanism 12 for removal of contaminants from a gas phase with a low pressure drop. Mechanism 12 is also incorporated into a typical refrigeration or air conditioning unit or rooftop unit 14 for conditioning air in a space 16, with outside ventilation 18 and exhaust 20. In this system, however, a greater amount of air is recycled from space 16 and back through rooftop unit 14, through use of mechanism 12 which allows for 1,200 cfm to be sufficiently purified as to meet a portion of the 1,800 cfm clean air requirement, thus requiring only 600 cfm to be provided from outside ventilation. This advantageously reduces the amount of air which must be conditioned from outside conditions, thereby reducing energy requirements to rooftop unit 14 and further allowing for a capital cost reduction by utilizing a potentially smaller unit.

It should readily be appreciated that the system as described in FIG. 2 can advantageously be incorporated into any type of gas phase or air handling system wherein purified air is desired to be recycled back to a conditioned space and, particularly, in a system where the source of clean or outside air is otherwise provided at conditions which would require substantially greater conditioning. Of course, the system and process of the present invention are readily applicable to other types of systems as well.

Figure 3:
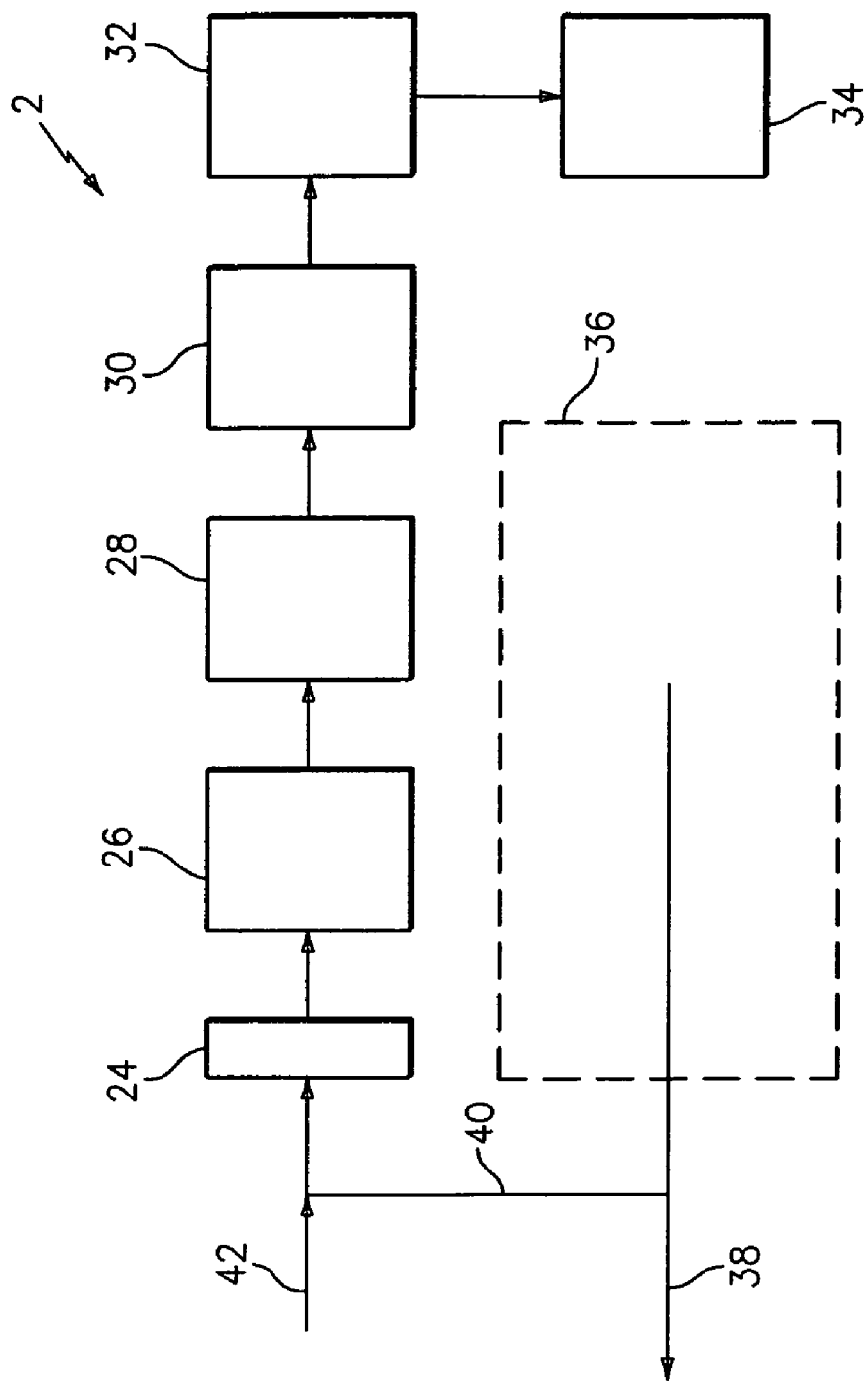
FIG. 3 schematically illustrates various potential components of a system in accordance with the present invention.

Turning to FIG. 3, a system 22 in accordance with the present invention is described in further detail, and including various additional components within the system which can be included to provide enhanced efficiency and the like.

System 22 as illustrated in FIG. 3 includes, in series, a coarse filter 24 which may advantageously be provided to remove large particulate matter from a stream passed therethrough, for example materials having a size greater than about 25 microns and, more preferably, greater than about 10 microns.

A further filter 26, such as an electrostatic precipitator or the like, can advantageously be positioned next in line in system 22 and is adapted for use to remove smaller particulate matter, for example particulate matter having a size of between about 0.1 and about 10 microns, preferably greater than about 0.3 microns, more preferably greater than about 1 micron.

The cooling unit 28 can advantageously be positioned next in line for receiving air having been filtered by filters 24, 26, and for substantially cooling the stream of air passed therethrough.

Still referring to FIG. 3, next along the path of air flow in system 22 can advantageously be a plasma unit 30 which can advantageously be used to remove various impurities such as microbes, virus, bacteria, acetaldehyde, formaldehyde, toluene, and the like. In further accordance with the invention, and advantageously, the next component of system 22 can advantageously be a mechanism 32 for removal of contaminant from a gas phase with low pressure drop, for example in the form of an ultraviolet photocatalytic oxidation zone. Mechanism 32 advantageously serves to oxidize various contaminants in the stream, such as volatile organic components (VOC), biocontaminants, bioaerosols or contaminants contained in aerosols or droplets entrained in the gas phase, ozone, NOx, CO, and the like.

Mechanism 32 is further advantageously coupled with some of the upstream components as illustrated in system 22. For example, both electrostatic precipitator or filter 26 and plasma unit 30 can cause problems in the form of generated ozone. However, mechanism 32, particularly when provided in the form of an ultraviolet photocatalytic oxidation mechanism, advantageously removes such ozone so as to resolve any potential issues with same.

Next in line in system 22 can advantageously be a humidifier 34, after which the stream of air can be fed to a space or spaces 36 to be conditioned.

As with the embodiment of FIG. 2, from space 36, air can be partially exhausted through exhaust 38, and can further be partially recycled through line 40 and back through filters 24, 26 to cooling unit 28. Further, a source 42 of outside air can also provide for intake of air in an amount equivalent to that exhausted through line 38.

Mechanism 32 advantageously serves to remove undesirable impurities from the air stream, and therefore allows for a greater amount of air to be recycled through line 40, with a resultantly smaller amount of air exhausted through exhaust 38, and a smaller amount of air to be drawn in from source 42. This is desirable as set forth above.

It should of course be appreciated that the system as illustrated in FIG. 3 contains various components in addition to mechanism 32, all of which are optional and which may or may not be incorporated into system 22 as desired. Such components are described herein, however, due to the particularly advantageous interaction between several of these components and mechanism 32 in accordance with the present invention.

Mechanism 32 may also be positioned within unit 28, and preferably still downstream of the cooling coil thereof.

It should further be appreciated that FIG. 3 illustrates a preferred placement of mechanism 32, in this case, downstream of cooling unit 28 and, more particularly, the cooling coil of cooling unit 28, such that the stream of air fed to mechanism 32 is at a reduced humidity. Reduced humidity in the air stream, and preferably a humidity less than about 40%, has been found to provide better activity in oxidation of the contaminants to be removed. Thus, placement of mechanism 32 downstream of the cooling unit or cooling coil as shown in the embodiment of FIG. 3 can advantageously serve to enhance the contaminant removal rate accomplished by mechanism 32 as desired. It should of course be appreciated that other mechanisms can be utilized for providing stream having reduced humidity, including dehumidifiers units, cooling units and the like, which serve to cool the stream to remove humidity, or otherwise remove humidity, and thereby provide a stream having humidity less than the desired level, for example less than about 40% relative humidity as discussed above.

It should further be appreciated that the system of FIG. 3, through the series of different types of filters incorporated into same, can advantageously provide for removal of diverse contaminants such as viruses, biocontaminants and the like. Removal of a like amount of contaminants using conventional filters would result in a substantially greater pressure drop than could be reasonably tolerated by the system, and would thereby adversely impact upon efficiency and capacity requirements of the system.

A further advantage of the system of the present invention is that the filters incorporated into a system such as system 22 are environmentally friendly to the extent that such filters can readily be cleaned and reused, thereby reducing the amount of potentially hazardous waste generated during use of the system.

Figure 4:
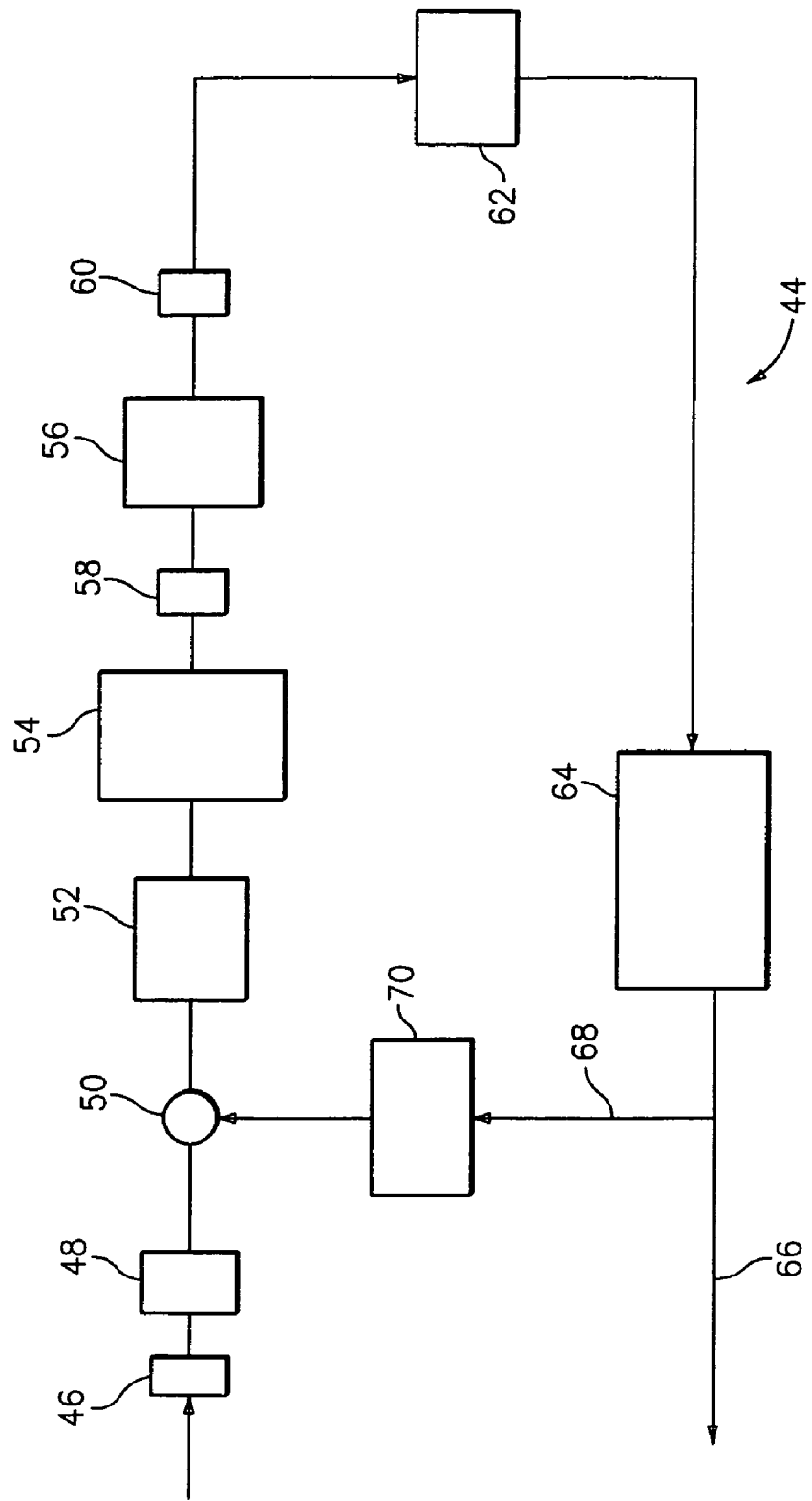
FIG. 4 schematically illustrates an alternative configuration of components in an air treatment system in accordance with the present invention.

Turning now to FIG. 4, another embodiment of a system in accordance with the present invention is provided.

FIG. 4 illustrates a system 44 in accordance with a further embodiment of the present invention.

As shown, system 44 can advantageously be provided with components including devices for heat recovery or humidity control such as heat recovery ventilation (HRV) and/or energy recovery ventilation (ERV) desiccant wheels 46, enthalpy wheels, evaporative coolers and the like, followed by a purifier 48 which feed air to a mixer 50 for mixing with air recycled as will be further discussed below.

A further purifier 52 is positioned downstream of mixer 50, followed by a cooling unit 54 such as a rooftop cooling unit or the like. A mechanism 56 for low pressure drop removal of contaminants from a gas phase or stream is advantageously positioned as shown in this embodiment, for further removal of contaminants as desired. Mechanism 56 can be similar to mechanisms 12, 32 as discussed above, and may advantageously be positioned between further components such as a dehumidifier 58 and a humidifier 60 whereby the gas phase to be treated by mechanism 56 is treated at a low humidity which, as discussed above, can advantageously provide for enhanced oxidative removal of contaminants as desired.

Further purifiers 62 can be positioned if desired, followed by feeding of air to space 64 to be conditioned, and exhaust from space 64 can be vented to outside through exhaust 66, or advantageously can be recycled through line 68 and through a further purifier 70 if desired and back to mixer 50 for recycling through system 44 as desired.

As with the embodiments described in connection with FIGS. 2 and 3, system 44 advantageously allows for reduced volume of air drawn in from the outside source, and thereby provides for enhanced efficiency of system 44. The system can also be provided at a smaller capital cost.

Further, this system serves to provide enhanced air purity, reduced pressure drop for energy savings, and more constant pressure and temperature operation as desired.

It should further be noted that a green wall or other mechanism for converting $CO_2$ into oxygen can advantageously be incorporated into system 44, or into the other systems as illustrated in previous embodiments, which could serve to further reduce the amount of air drawn in from outside sources. Properly configured, through use of a green wall, a system could be provided which does not utilize any outside source of air. This, too, has various advantages, for example in situations where the outside air is unfit for use due to extreme conditions and/or contaminants which cannot readily be removed.

Figure 5:
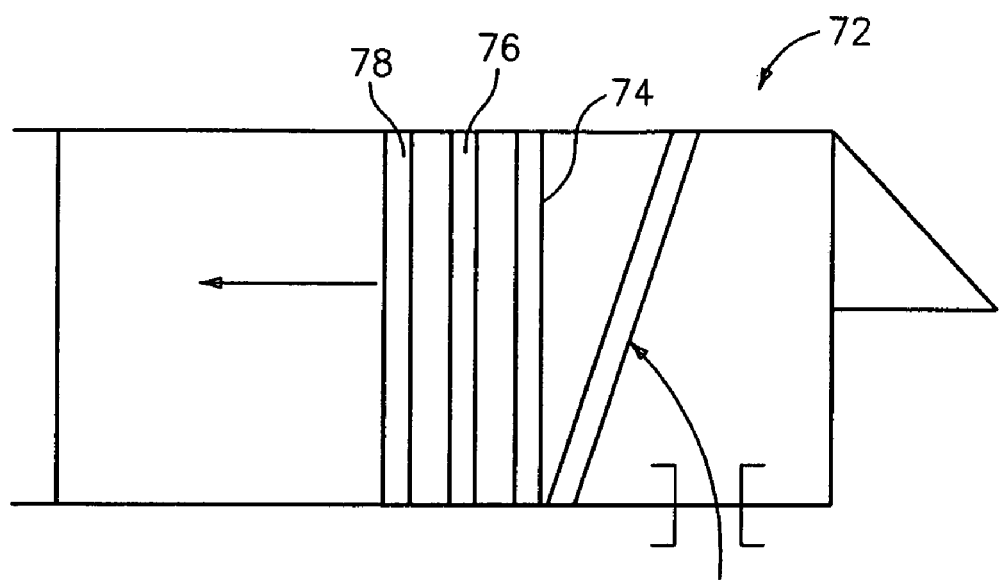
FIG. 5 schematically illustrates an air purification mechanism positioned downstream of a cooling coil in accordance with the present invention.
Figure 6:
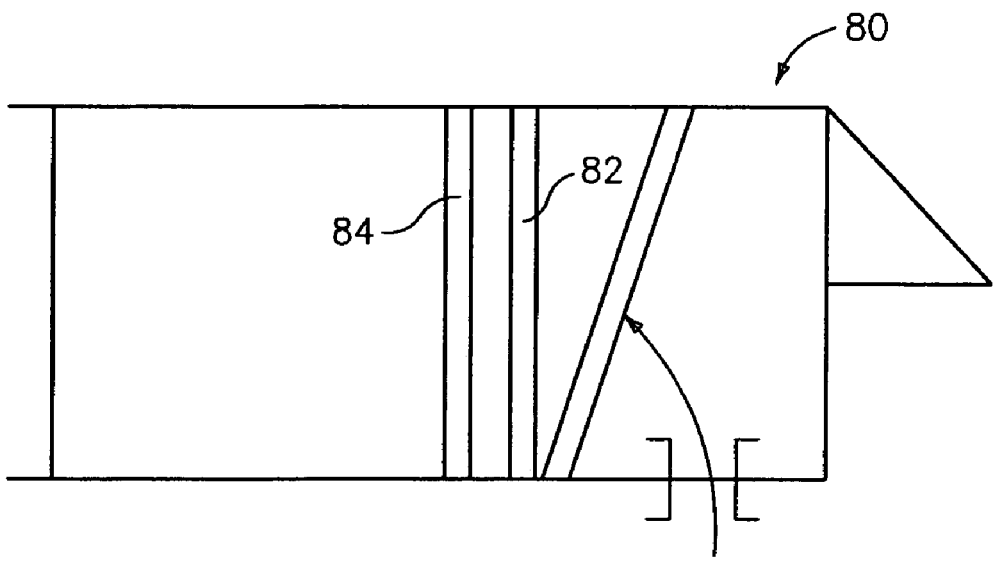
FIG. 6 schematically illustrates a system similar to that of FIG. 5, wherein the air purification mechanism is positioned upstream of the cooling coil.

FIGS. 5 and 6 further illustrate the potential placement of the low pressure contaminant removal mechanism in accordance with the present invention, which as shown in FIG. 5 can be positioned in a system 72 having a cooling coil 74 and two mechanisms 76, 78 positioned downstream of cooling coil 74 as desired so as to treat a stream of air having reduced humidity.

Mechanisms 76, 78 can advantageously be any type of mechanism as described above and, preferably, can be provided as mechanisms for oxidative removal of contaminants, preferably in the form of ultraviolet photocatalytic oxidation units positioned between catalyst coated structures. Such units, and alternatives within the scope of the present invention, will be further discussed below.

FIG. 6 shows a system 80 wherein a single mechanism 82 is positioned upstream of cooling coil 84, and while not preferred in many cases due to greater humidity in the gas phase, this system may be desirable in certain instances as well, for example, in conditions of existing low humidity, or where dictated by space or serviceability considerations.

As set forth above, mechanism 12, 32, 56, 76, 78 and 82 as illustrated in various embodiments herein can be any of a wide variety of mechanisms for removal, preferably oxidative removal, of contaminants in a gas phase or stream. As used herein, this specifically includes, but is not limited to, mechanisms for removal of particulate matter, entrained liquid matter, particulate matter dissolved within entrained liquid matter and the like. Further, this specifically includes but is not limited to biocontaminants, viruses, and the like.

The preferred mechanism for such removal is photocatalytic oxidation (PCO), and more preferably is ultraviolet photocatalytic oxidation (UVPCO). Such oxidation can be accomplished by exposing the gas phase or stream to a source of light at the proper wavelength, preferably in the presence of a suitable catalyst.

Suitable wavelength light can be generated utilizing various types of lamps, LED devices, LEC devices, excimer lamps, sono-luminescence, direct sunlight, dielectric barrier discharge lamps, ozone lamps and the like.

Particularly preferred types of light to be utilized include UV-A wavelength, having a wavelength in the range of 315-400 nm, UV-B, having a wavelength between 280-315 nm, and UV-C having a wavelength between 100-280 nm. Germicidal activity has been found to occur at wavelengths between about 180 and about 300 nm.

Within the above constraints, it has been found that with typical titania-based catalyst, wavelength shorter than about 400 nm, preferably shorter than about 360 nm, are desired in order to excite the electron-hole pair generation in the catalyst. Further, it may be desired to utilized wavelengths greater than about 200 nm in order to avoid generation of ozone.

The most common source of ultraviolet light in these wavelengths is a mercury plasma lamp. However, alternatives to such lamps are desirable since mercury plasma lamps can lose effectiveness at relatively cool temperatures, contain potentially hazardous materials which can be restricted in disposal, and have other efficiency issues as well.

Excimer plasma lamps are particularly desirable since they do not lose effectiveness at the cool temperatures mentioned above, and do not generate harmful or hazardous waste. Further, excimer lamps are particularly efficient since the plasma does not re-absorb radiation generated thereby.

A further source of suitable ultraviolet wavelength light is light-emitting electromechanical cells (LECs) which can activate the photocatalysis process. LEC's have a low cost and lower power consumption than many alternatives, and thereby can increase the service life and efficiency of the system. LECs are a blend of polymers and electrodes, and the polymer can emit photons when applied with the correct voltage as desired.

As mentioned above, a particularly preferred PCO catalyst is titania-based catalyst such as DEGUSSA P-25, Millenium Tiona, and the like. Other suitable catalysts include ZnO, CdS, $WO_3$, $SrTiO_3$, $Fe_2O_3$, $V_2O_5$, $SnO_2$, $FeTiO_3$, PbO and combinations thereof. In addition, metal dopers such as Pt, Au and the like can be supported on the catalyst. These catalysts can advantageously be positioned for exposure to the gas phase or stream and light in a variety of configurations. One preferred embodiment is to provide a substrate or support in the form of a low-pressure-drop structure such as a honeycomb, and to coat the catalyst onto this honeycomb structure. This allows for good exposure of the gas phase to the catalyst and light, while minimizing pressure drop from passing the gas phase through the honeycomb. Of course, other structures could be utilized and would be well within the scope of the present invention.

A further advantage of this type of configuration is that ultraviolet light serves to continuously regenerate the catalyst through destruction of materials which would normally be deposited or absorbed on to same. Thus, a PCO system in accordance with this embodiment of the present invention does not need to be regenerated, cleaned or otherwise taken off line under most circumstances.

Figure 7:
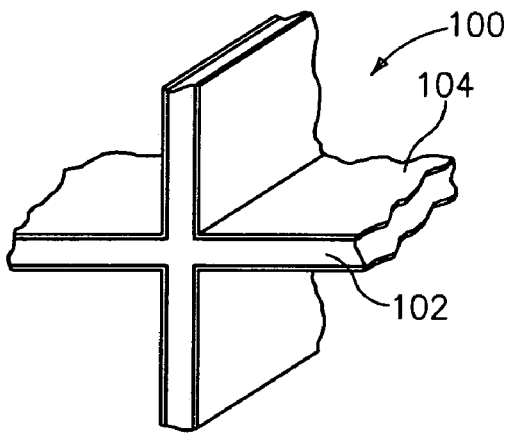
FIG. 7 illustrates a honeycomb support structure in accordance with the present invention.

As set forth above, a porous honeycomb structure is one embodiment of a catalyst support or substrate for the low pressure drop mechanism of the present invention. FIG. 7 shows a portion 100 of such a honeycomb, and shows the honeycomb structure 102 coated with a layer 104 of catalyst as desired. According to the invention, honeycomb 100 can be provided having pore area defined by pores having an average pore size which is suitable to provide for a low pressure drop.

Figure 8:
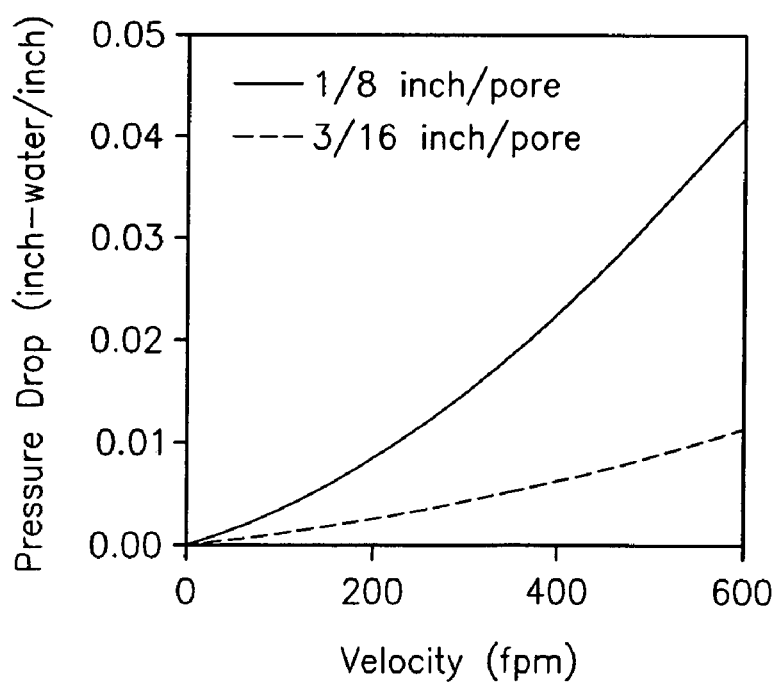
FIG. 8 illustrates the relation between pore size of a honeycomb structure and pressure drop experienced over same.

FIG. 8 shows relationship between flow velocity and pressure drop for a honeycomb structure having a pore size of ⅛ inch and for a honeycomb structure having a pore size of 3/16 inch. The pore size generates a pressure drop which depends upon flow velocity. A typical flow velocity is about 500 feet per minute (fpm). At such a velocity, a low pressure drop mechanism according to the invention advantageously provides for a pressure drop, measured in inches of water per inch of thickness of the honeycomb structure, of less than about 0.2 inch-water/inch, more preferably less than about 0.15 inch-water/inch, and further preferably less than or equal to about 0.075 inch-water/inch.

The pore size in the honeycomb structure can advantageously be between about 1/16 and about ¼ inch in size, more preferably between about ⅛ and about 3/16 inch in size. The wall thickness between pores is advantageously very thin. This provides for a void fraction, that is a fraction of void space to total flow area, of at least about 80%, preferably at least about 95%.

The honeycomb structure can have a thickness in the flow direction which is selected to maximize surface area while maintaining light propagation into the pores at a good level. According to the invention, the honeycomb can advantageously have a thickness of between about ¼ and about 2 inches, preferably between about ½ and about 1 and ½ inches, and most preferably about 1 inch. It should of course be appreciated that while the foregoing information is given in terms of various preferred characteristics of the low pressure drop structure according to the invention, alternative structures can be used well within the broad scope of the present invention.

It should be appreciated that a system and method have been provided which accomplish each and every objective of the present invention, and namely which allow for treatment of a stream of air to effectively remove contaminants without creating a substantial pressure drop, whereby existing systems can be modified, and new systems prepared, which are readily able to remove contaminants from the air stream.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope.

What is claimed is:

1. An energy efficient system for removing contaminants from gas in a gas phase handling system comprising:
    a gas handling component for receiving a stream of gas at a first humidity and providing a produced stream of gas with a reduced humidity and a relative humidity which is less than about 40%; and
    a low pressure drop impurity removing mechanism operatively connected with the gas handling component for receiving the produced stream for removing at least one impurity from the gas, wherein the gas handling component comprises a heating unit.

2. The system of claim 1, wherein the gas handling component comprises a dehumidifier.

3. The system of claim 2, wherein the low pressure drop mechanism is operatively connected downstream of the dehumidifier.

4. The system of claim 1, wherein the gas handling component is a cooling coil.

5. The system of claim 4, wherein the low pressure drop mechanism is operatively connected downstream of the cooling coil.

6. The system of claim 1, wherein the low pressure drop impurity removing mechanism is operatively connected downstream of the heater.

7. The system of claim 1, wherein the low pressure drop mechanism is an ultraviolet photocatalytic oxidation unit comprising at least one low pressure drop structure disposed within the photocatalytic oxidation unit, the at least one low pressure drop structure having a catalytic layer disposed thereon, and at least one ultraviolet source adjacent to the at least one low pressure drop structure.

8. The system of claim 7, wherein the catalytic layer comprises a photoactive material.

9. The system of claim 7, wherein the catalytic layer comprises a titania-based catalyst.

10. The system of claim 7, wherein the catalytic layer comprises a catalyst selected from the group consisting of ZnO, Ods, $WO_3$, $SrTiO_3$, $Fe_2O_3$, $V_2O_5$, $SnO_2$, $FeTiO_3$, PbO and combinations thereof.

11. The system of claim 7, wherein the catalytic layer further comprises a metal dopant.

12. The system of claim 7, wherein the catalytic layer is adapted to react with the at least one impurity flowing through the photocatalytic oxidation unit when activated by the at least one ultraviolet source.

13. The system of claim 12 wherein the at least one ultraviolet source is effective to oxidize volatile organic compounds contained in the at least one impurity in contact with the catalytic layer.

14. The system of claim 1, wherein the low pressure drop mechanism is adapted to destroy bioaerosols.

15. The system of claim 1, wherein the at least one ultraviolet source destroys bioaerosols in the gas.

16. The system of claim 1, wherein the low pressure drop mechanism comprises an ultraviolet light source.

17. The system of claim 16, wherein the ultraviolet light source is selected from the group consisting of mercury plasma lamps, excimer plasma lamps, light-emitting electromechanical cells, sunlight, light-emitting diodes, sono-luminescence, dielectric barrier discharge lamps, ozone lamps and combinations thereof.

18. The system of claim 1, wherein the at least one low pressure drop structure is selected from the group consisting of ceramic fiber substrates, non-flammable substrates, ceramic substrates, aluminum substrates and combinations thereof.

19. The system of claim 1, wherein the at least one low pressure drop support structure is selected from the group consisting of honeycomb structures, fin structures and combinations thereof.

20. The system of claim 1, further comprising at least one filter for removing particulate matter from the gas upstream of the low pressure drop mechanism.

21. The system of claim 1, wherein the low pressure drop mechanism shows a pressure drop at a velocity of about 500 fpm of less than about 0.2 inch-water/inch.

22. An energy efficient system for removing contaminants from gas in a gas phase handling system comprising:
    a gas handling component for receiving a stream of gas at a first humidity and providing a produced stream of gas with a reduced humidity and a relative humidity which is less than about 40%; and
    a low pressure drop impurity removing mechanism operatively connected with the gas handling component for receiving the produced stream for removing at least one impurity from the gas, wherein the low pressure drop mechanism is disposed in a fan coil unit.

23. An energy efficient system for removing contaminants from gas in a gas phase handling system comprising:
    a gas handling component for receiving a stream of gas at a first humidity and providing a produced stream of gas with a reduced humidity and a relative humidity which is less than about 40%; and
    a low pressure drop impurity removing mechanism operatively connected with the gas handling component for receiving the produced stream for removing at least one impurity from the gas, further comprising a carbon dioxide conversion mechanism operatively connected upstream of the gas handling component.

24. An energy efficient system for removing contaminants from gas in a gas phase handling system comprising:
    a gas handling component for receiving a stream of gas at a first humidity and providing a produced stream of gas with a reduced humidity and a relative humidity which is less than about 40%; and
    a low pressure drop impurity removing mechanism operatively connected with the gas handling component for receiving the produced stream for removing at least one impurity from the gas, further comprising a carbon dioxide conversion mechanism operatively connected upstream of the gas handling component.

25. An energy efficient system for removing contaminants from gas in a gas phase handling system comprising:
    at least one filter for removing a particulate matter from a gas;
    a cooling unit operatively connected downstream of the at least one filter for receiving and cooling the gas and reducing relative humidity of the gas to less than about 40%;
    a plasma unit operatively connected downstream of the cooling unit for removing at least one first impurity from the gas;
    a low pressure drop mechanism operatively connected downstream of the plasma unit for removing at least one second impurity from the gas; and
    a humidifier operatively connected downstream of the low pressure drop mechanism for humidifying the gas.

* * * * *

UNITED STATES PATENT AND TRADEMARK OFFICE
CERTIFICATE OF CORRECTION

PATENT NO. : 7,399,331 B2
APPLICATION NO. : 10/857301
DATED : July 15, 2008
INVENTOR(S) : Gregory M. Dobbs et al.

It is certified that error appears in the above-identified patent and that said Letters Patent is hereby corrected as shown below:

In column 8, claim 10, line 64, delete "Ods" and insert --CdS--

In column 10, claim 24, lines 24 26, delete "a carbon dioxide conversion mechanism operatively connected upstream of the gas handling component" and insert therefor --at least one filter for removing particulate matter from the gas; wherein the gas handling component comprises a cooling coil operatively connected downstream of the at least one filter for receiving and cooling the gas; and wherein the low pressure drop mechanism is operatively connected downstream of the cooling coil--.

Signed and Sealed this

Tenth Day of August, 2010

David J. Kappos
*Director of the United States Patent and Trademark Office*